(No Model.)
A. S. WILLIAMS.
PROTECTIVE APPLIANCE FOR ELECTRICAL APPARATUS.
No. 588,206.  Patented Aug. 17, 1897.
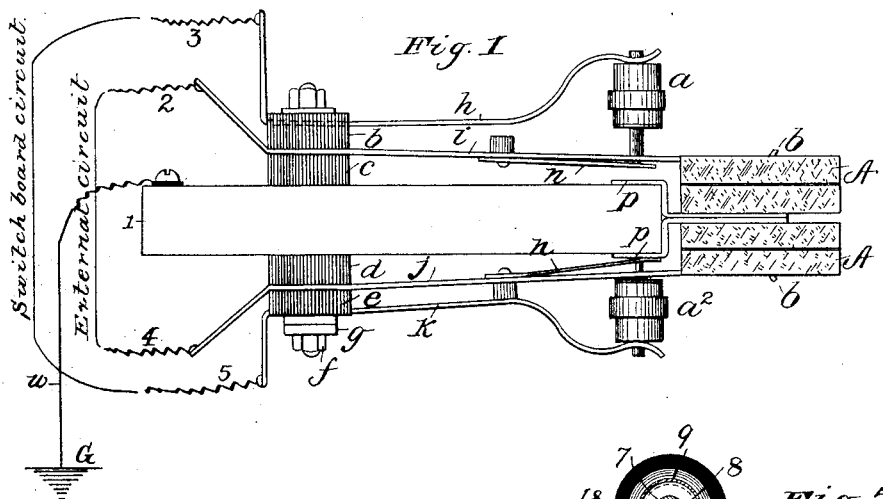
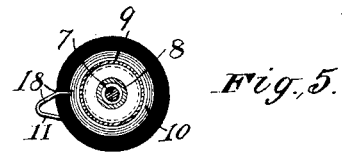
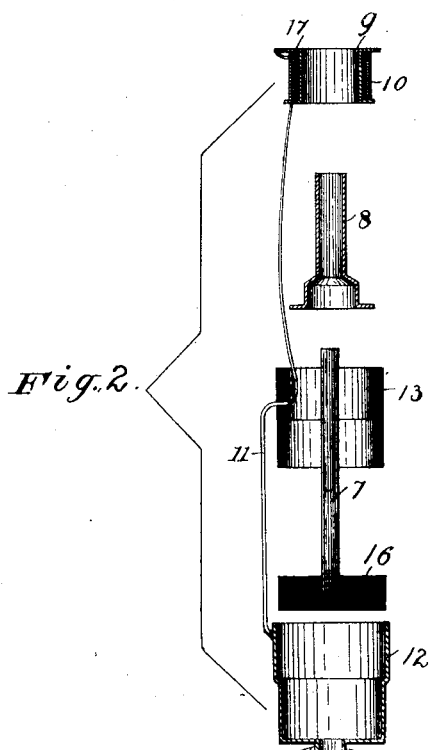
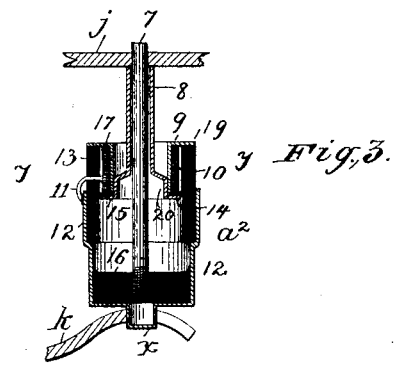
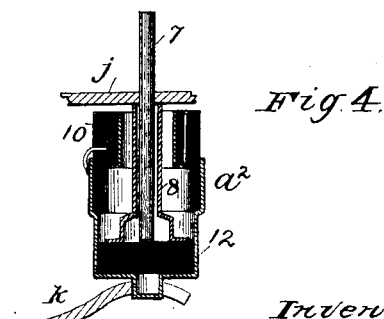
Witnesses
W. R. Edelin,
Peter Lewis
Inventor
Archer S. Williams,
by Pollard & Mauro,
his attorneys.

UNITED STATES PATENT OFFICE.

ARTHUR S. WILLIAMS, OF NEWTON, MASSACHUSETTS, ASSIGNOR TO THE AMERICAN BELL TELEPHONE COMPANY, OF BOSTON, MASSACHUSETTS.

PROTECTIVE APPLIANCE FOR ELECTRICAL APPARATUS.

SPECIFICATION forming part of Letters Patent No. 588,206, dated August 17, 1897.

Application filed May 7, 1897. Serial No. 635,542. (No model.)

*To all whom it may concern:*

Be it known that I, ARTHUR S. WILLIAMS, residing at Newton, in the county of Middlesex and State of Massachusetts, have invented certain Improvements in Protective Appliances for Electrical Apparatus, of which the following is a specification.

In providing means for the protection of electrical apparatus from the destructive effects of abnormal currents it is well understood that separate and distinctive devices must be used to guard against the different classes of such currents. Protective appliances of one kind, in which an air-gap in the grounded branch is the distinctive feature, are used to guard the apparatus in the circuit from high potential charges or discharges. Ordinary fuses and tube-inclosed fuses are employed to afford protection against currents of great strength or volume, while for protection against abnormal currents, which, being relatively weak, are usually denominated "sneak-currents," and which if they persist for a considerable time gradually raise the temperature of the fine wires of the helices of the instruments, it is common to employ in the circuit some metal or alloy which will melt or soften and open the circuit and also sometimes ground it before the said helices are heated to a dangerous degree.

The present invention relates mainly to appliances which are used for the purpose of protection against these so-called "sneak-currents," which are especially dangerous to switchboard-wires and telephone apparatus, not so much by reason of their strength as of their tendency to gradually heat and cause the smoldering of the insulation of the wires and instrument-helices and adjacent combustible material, which not infrequently results in destructive fires.

The invention consists of a protective appliance adapted to be held in supports under spring-pressure, which supports may be line-conductor terminal springs and normally forming an electrical connection between the said supports, but adapted to dissever the same, opening the circuit, and also to ground the line, if desired; and it consists of a thimble provided with a heating-coil at one end thereof, an insulated pin extending from the opposite end through the coil, and a tube concentric with the pin soldered to the bobbin of the coil. When an abnormal current continues upon the line for a sufficiently long time, the solder becomes melted and the concentric tube is forced away from the bobbin, thereby opening the circuit, and the pin or a contact-spring impelled thereby is brought into contact with a ground-plate, a path to ground being thus provided for the line end or side of the opened circuit, as will be more fully described hereinafter.

I prefer to describe the invention in association with the grounding-plate of a telephone-circuit-distributing frame, such as is shown in Patent No. 507,424, dated October 24, 1892, granted to Ford and Lenfest.

In the accompanying drawings, Figure 1 is a cross-section of the upright grounding-plate, upon which a plurality of protective appliances are located, as shown and described in said patent. Fig. 2 represents the different parts of my protective appliance separated to disclose their arrangement with relation to each other. Figs. 3 and 4 are sections of the invention, illustrating its construction and operation; and Fig. 5 is a section on line $y\ y$ of Fig. 3.

1 represents a vertical iron plate constituting that part of the distributing-frame to which the circuits entering a telephone central office are connected before they terminate at the switchboard. The protective appliances $a$, one for each circuit-conductor, are attached to this plate on each side thereof and opposite each other, the lower one $a^2$ shown as having come into operation. The plate is connected to ground G by the wire $w$. The protectors are all alike in construction, and each pair for a pair of conductors constituting a metallic circuit are united to each other on the opposite sides of the plate 1 by screws $f$. One incoming conductor 2 connects with the end of spring-finger $i$, and the circuit continues through the protective device $a$ and the spring-finger $h$ to conductor 3 and thence to the switchboard connections and appliances, from whence the circuit returns by way of conductor 5, spring $k$, protective device $a^2$, spring $j$, and conductor 4. The conductors 2 and 4 are therefore the two ends of the external or main circuit, and the conductors 3 and 5 are the ends of the switchboard continuation thereof.

The springs are provided with holes or slots to receive the ends of the device $a$ and $a^2$, and the springs $i$ and $j$ are prolonged and terminate in narrow ends 6 to hold the carbon-plate air-space protectors in position upon the grounding-plate extension $p\ p$, as fully described in Patent No. 564,084, dated July 14, 1896, granted to A. de Khotinsky.

The springs $h$, $i$, $j$, and $k$ are separated and insulated from the grounding-plate 1 and from each other by the insulating strips or washers $b$, $c$, $d$, and $e$ and are firmly held in place by the screws $f$.

The protective device constituting the invention is fully shown in the Figs. 2, 3, and 4, which are exaggerated in size to more closely show the construction. 12 is a metal thimble which may be stamped or spun into shape and is provided on its end with a stud $x$. 16 is a button, of insulating material, fitting snugly in the bottom of the thimble, and 7 is a pin screwed thereinto. The tube 13, of insulating substance, fits tightly into the enlarged end of the thimble. It is slitted longitudinally, as at 18, so that it can be expanded and passed over the metal spool 9, which has an outer flange 19 of the same diameter as that of the tube 13. A fine German-silver wire 11, having an insulating-covering, is wound into a coil 10 upon the spool, and one end thereof is soldered at 17 to the outer flange 19, while the other end is brought out through the slit 18 and soldered to the thimble 12. The solder used in making these two connections is comparatively hard, melting at about 350° Fahrenheit. Instead of German silver the heating-coil may be formed of any suitable metal or alloy.

8 is a tube concentric with the pin 7, having its lower end 20 enlarged to fit the interior of the spool 9, and is provided at its inner extremity with a flange 15, attached by soft solder or similar easily-fusible alloy or metal to the inner flange 14 of the bobbin. The solder used in making this connection may be any soft alloy melting at about 160°. The flange or the entire enlarged end of the tube may, if desired, be wholly formed of such easily-fusible metal.

Fig. 3 represents the device assembled and as placed between the spring-fingers, the outer end of the finger $k$ embracing the stud $x$ and the inner flange $j$ pressing upon the end of the tube 8, the pin 7 passing through the hole in the finger. The circuit extends from the springs $i$ or $j$ through cylinder 8 and its flange 15 to the flange 14 of the bobbin 9 and from the outer flange 17 thereof through the heating-coil 10 and wire 11 to thimble 12 and the spring $k$ or $h$, as the case may be.

When a dangerous current of the character described traverses the line for a sufficient length of time, the resistance of the heating-coil causes the development of heat, which is communicated to the spool and acts upon the solder forming the lower portion of the tube or uniting the flanges 14 and 15. This in a short time becomes sufficiently softened and, yielding to the force exerted by the springs $j$ and $k$, permits them to sever the contact surfaces or flanges 15 and 14 of the tube 8 and heating-coil spool 9, respectively, bringing the parts into the position illustrated by Fig. 4. The pin 7 then presses the spring $n$ into contact with the grounding-plate 1, and at the same time the circuit is opened between the bobbin 9 and the tube 8, and the line, via spring $j$ and pin 7 and plate 1, is grounded.

The device is not liable to become damaged by the melting of the soft solder, and the parts can therefore be resoldered and used indefinitely.

The employment of a protective device which both opens the circuit and grounds its line conductors enables the said device to come into action and shunt the dangerous current to earth without at the same time exercising a similar drain of the central-office-battery current, which otherwise would ensue, leaving other circuits receiving supply from the same battery depleted of their calling-current.

Having thus explained my invention, I claim—

1. A protective appliance adapted to be held in supports under spring-pressure and normally forming an electric connection between the said supports but adapted to dissever the same, consisting of a metal thimble provided with a heating-coil at one end, an insulated pin extending from the opposite end through the said coil, and a metal tube concentric with said pin and soldered to the bobbin of the coil, as and for the purpose set forth.

2. A protective appliance adapted to be held in supports under spring-pressure, and normally forming an electric connection between the said supports but adapted to dissever the same; consisting of a metal thimble provided with an insulated heating-coil wound over a metal spool at one end, an insulating-button in the opposite end supporting a metal pin which projects through the axis of said coil, and a metal tube concentric with said pin soldered to the bobbin of the coil, as and for the purpose set forth.

3. A protective appliance composed of two line-conductor terminal springs; a ground-plate; and a device between said springs normally forming an electric connection between the same but adapted to dissever said connection and connect one of the springs to ground; the said device comprising a thimble provided with a heating-coil at one end, an insulated pin extending from the opposite end through the said coil, and a tube concentric with said pin and soldered to the bobbin of the coil, as set forth.

In testimony whereof I have signed my name to this specification, this 3d day of May, 1897, in the presence of two subscribing witnesses.

ARTHUR S. WILLIAMS.

Witnesses:
JOSEPH A. GATELY,
THOMAS D. LOCKWOOD.